United States Patent
Hathaway

(10) Patent No.: US 10,707,951 B2
(45) Date of Patent: *Jul. 7, 2020

(54) INTEGRATED COMMUNICATION AND APPLICATION SYSTEM FOR AIRCRAFT

(71) Applicant: WestJet Airlines Ltd., Calgary (CA)

(72) Inventor: David Hathaway, Calgary (CA)

(73) Assignee: WestJet Airlines Ltd., Calgary (CA)

( * ) Notice: Subject to any disclaimer, the term of this patent is extended or adjusted under 35 U.S.C. 154(b) by 139 days.

This patent is subject to a terminal disclaimer.

(21) Appl. No.: 15/916,559

(22) Filed: Mar. 9, 2018

(65) Prior Publication Data

US 2018/0205445 A1  Jul. 19, 2018

Related U.S. Application Data

(63) Continuation of application No. 15/584,730, filed on May 2, 2017, now Pat. No. 9,973,263, which is a
(Continued)

(51) Int. Cl.
*B64D 47/00* (2006.01)
*H04B 7/185* (2006.01)
(Continued)

(52) U.S. Cl.
CPC ......... *H04B 7/18506* (2013.01); *B64C 19/00* (2013.01); *B64D 45/00* (2013.01);
(Continued)

(58) Field of Classification Search
USPC .................. 701/1, 3–18, 36; 244/75.1, 76 R; 345/173
See application file for complete search history.

(56) References Cited

U.S. PATENT DOCUMENTS 5,351,194 A   9/1994  Ross et al.
5,463,656 A   10/1995 Polivka et al.
(Continued)

FOREIGN PATENT DOCUMENTS

EP   1101177   5/2001
EP   1945510   7/2008
(Continued)

OTHER PUBLICATIONS

Advisory Circular, "Guidelines for the Certification, Airworthiness, and Operational Approval of Electronic Flight Bag Computing Devices," U.S. Department of Transportation, Federal Aviation Administration, Mar. 17, 2003. (32 pages).
(Continued)

*Primary Examiner* — Jonathan L Sample
(74) *Attorney, Agent, or Firm* — Neal, Gerber & Eisenberg LLP

(57) ABSTRACT

A method of transferring aircraft data from an aircraft to a portable electronic device entails receiving at the portable electronic device the aircraft data from a data connection with an aircraft data source without writing data back to the aircraft or from a user interface while being capable of receiving aircraft data via the data connection and executing an application on the portable electronic device using the aircraft data to present new information about the aircraft or its operating environment that is not available for display on a cockpit display but which is displayable on the portable electronic device based on the aircraft data received by the portable electronic device.

20 Claims, 5 Drawing Sheets

Related U.S. Application Data continuation of application No. 14/977,803, filed on Dec. 22, 2015, now Pat. No. 9,650,153, which is a continuation of application No. 14/067,629, filed on Oct. 30, 2013, now Pat. No. 9,260,182.

(51) Int. Cl.

| | | |
|---|---|---|
| B64C 19/00 | (2006.01) | |
| B64D 47/08 | (2006.01) | |
| B64D 45/00 | (2006.01) | |
| G06F 17/00 | (2019.01) | |
| H04L 29/06 | (2006.01) | |
| H04L 29/08 | (2006.01) | |
| G06F 8/60 | (2018.01) | |

(52) U.S. Cl.
CPC ............ *B64D 47/08* (2013.01); *G06F 17/00* (2013.01); *H04L 63/0428* (2013.01); *H04L 67/04* (2013.01); *H04L 67/12* (2013.01); *H04L 67/34* (2013.01); *B64D 2045/0075* (2013.01); *G06F 8/60* (2013.01)

(56) References Cited

U.S. PATENT DOCUMENTS

| | | | |
|---|---|---|---|
| 5,652,717 A | 7/1997 | Miller et al. | |
| 5,943,399 A | 8/1999 | Bannister et al. | |
| 6,047,165 A | 4/2000 | Wright et al. | |
| 6,078,963 A | 6/2000 | Civanlar et al. | |
| 6,104,914 A | 8/2000 | Wright et al. | |
| 6,108,523 A | 8/2000 | Wright et al. | |
| 6,148,179 A | 11/2000 | Wright et al. | |
| 6,154,636 A | 11/2000 | Wright et al. | |
| 6,154,637 A | 11/2000 | Wright et al. | |
| 6,181,990 B1 | 1/2001 | Grabowsky et al. | |
| 6,308,044 B1 | 10/2001 | Wright et al. | |
| 6,308,045 B1 | 10/2001 | Wright et al. | |
| 6,353,734 B1 | 3/2002 | Wright et al. | |
| 6,522,867 B1* | 2/2003 | Wright ................ G05D 1/0055 340/945 | |
| 6,745,010 B2 | 6/2004 | Wright et al. | |
| 6,775,545 B2 | 8/2004 | Wright et al. | |
| 6,816,728 B2 | 11/2004 | Igloi et al. | |
| 6,915,189 B2 | 7/2005 | Igloi et al. | |
| 6,937,937 B1 | 8/2005 | Manfred et al. | |
| 6,990,319 B2 | 1/2006 | Wright et al. | |
| 7,149,612 B2 | 12/2006 | Stefani et al. | |
| 7,161,525 B1* | 1/2007 | Finley .................... G01S 7/062 | |
| RE40,479 E | 9/2008 | Wright et al. | |
| 7,426,387 B2 | 9/2008 | Wright et al. | |
| 7,426,388 B1 | 9/2008 | Wright et al. | |
| 7,428,412 B2 | 9/2008 | Wright et al. | |
| 7,444,146 B1 | 10/2008 | Wright et al. | |
| 7,512,714 B2 | 3/2009 | Eckert | |
| 7,546,123 B2 | 6/2009 | Wright et al. | |
| 7,640,098 B2 | 12/2009 | Stenbock et al. | |
| 7,769,376 B2 | 8/2010 | Wright et al. | |
| 7,835,734 B2 | 11/2010 | Eckert et al. | |
| 7,840,770 B2 | 11/2010 | Larson et al. | |
| 8,301,368 B1 | 10/2012 | Masson | |
| 8,341,298 B2 | 12/2012 | Wilber et al. | |
| 8,433,475 B2 | 4/2013 | Corbefin | |
| 9,003,085 B2* | 4/2015 | Saugnac ............ G08G 5/0021 710/62 | |
| 2002/0018008 A1 | 2/2002 | Wright et al. | |
| 2003/0003872 A1 | 1/2003 | Brinkley et al. | |
| 2003/0093187 A1* | 5/2003 | Walker ................ B64C 13/20 701/1 | |
| 2003/0157875 A1* | 8/2003 | Homer ................ B64D 13/02 454/74 | |
| 2003/0160706 A1* | 8/2003 | Endress ............ B64D 11/0015 340/945 | |
| 2003/0192052 A1* | 10/2003 | Frisco ................ G06Q 30/02 725/76 | |
| 2004/0226996 A1* | 11/2004 | Stefani ................ G01G 19/07 235/384 |
| 2005/0149238 A1* | 7/2005 | Stefani ................ G01D 9/005 701/33.4 |
| 2006/0282597 A1* | 12/2006 | Plogmann ............ G01C 23/005 710/303 |
| 2007/0055416 A1* | 3/2007 | Allen ................ G08G 5/0013 701/3 |
| 2007/0127460 A1 | 6/2007 | Wilber et al. | |
| 2008/0154446 A1* | 6/2008 | Rui ........ B64D 43/00 701/3 |
| 2009/0125169 A1 | 5/2009 | Edwards et al. | |
| 2010/0105329 A1* | 4/2010 | Durand ................ G06F 1/1632 455/41.2 |
| 2010/0106870 A1 | 4/2010 | Saugnac | |
| 2010/0109975 A1* | 5/2010 | Larson ................ G02B 27/017 345/8 |
| 2012/0078451 A1* | 3/2012 | Ohtomo ................ B64C 39/024 701/15 |
| 2012/0147030 A1 | 6/2012 | Hankers et al. | |
| 2012/0191273 A1* | 7/2012 | Jacobs ............... B64D 45/0059 701/3 |
| 2012/0203997 A1 | 8/2012 | Block | |
| 2012/0218127 A1* | 8/2012 | Kroen ................ G08G 5/0034 340/945 |
| 2012/0265372 A1* | 10/2012 | Hedrick ............ H04B 7/18506 701/3 |
| 2012/0270531 A1 | 10/2012 | Wright et al. | |
| 2013/0232237 A1* | 9/2013 | Zulch, III ............ H04W 12/001 709/220 |
| 2013/0268146 A1* | 10/2013 | Baudry .................. B64C 19/00 701/3 |
| 2013/0274962 A1* | 10/2013 | Cornell ................ B64D 43/00 701/3 |
| 2013/0297102 A1* | 11/2013 | Hughes ................ G05D 1/0083 701/3 |
| 2014/0074322 A1* | 3/2014 | Baumgarten ...... G05B 23/0216 701/3 |
| 2014/0107871 A1* | 4/2014 | Williams ................ G01C 21/20 701/3 |
| 2014/0124644 A1* | 5/2014 | Wong .................. E05B 73/0082 248/553 |
| 2014/0212847 A1* | 7/2014 | Holder ................ G09B 19/165 434/35 |
| 2014/0222254 A1* | 8/2014 | Ribich ...................... G06F 8/00 701/3 |
| 2014/0240242 A1* | 8/2014 | Kawalkar ............ G06F 3/0418 345/173 |
| 2014/0336921 A1* | 11/2014 | Schulte ................ G01C 23/005 701/409 |
| 2015/0005989 A1* | 1/2015 | Beltrand ................ B64C 19/00 701/3 |
| 2015/0120097 A1* | 4/2015 | Hathaway ............... B64C 19/00 701/14 |

FOREIGN PATENT DOCUMENTS

| | | |
|---|---|---|
| EP | 2196775 A1 | 6/2010 |
| EP | 2378676 | 10/2011 |
| EP | 2196775 B1 | 4/2015 |
| WO | WO20000063806 | 10/2000 |
| WO | WO2007050164 | 5/2007 |
| WO | WO20130050505 | 4/2013 |

OTHER PUBLICATIONS

Extended Search Report for European Patent Application No. 18184445.7 dated Sep. 17, 2018. (14 pages).

Smith, "Delta Airlines now testing Apple iPad as electronic flight bag," 4 pp., Aug. 17, 2011, retrieved from the internet <https://appleinsider.com/articles/11/08/17/delta_airlines_now_testing_apple_ipad_as_electronic_flight_bag>. (4 pages).

Extended European Search Report for European Patent Application No. 14156972.3 dated Oct. 9, 2014.

Office Action for Canadian Patent Application No. 2,831,509 dated Apr. 13, 2015.

(56) References Cited

OTHER PUBLICATIONS

Office Action for Canadian Patent Application No. 2,831,509 dated Feb. 19, 2014.
Office Action for Canadian Patent Application No. 2,868,997 dated Oct. 20, 2016.
Office Action for Canadian Patent Application No. 2,868,997 dated Dec. 23, 2015.
Office Action for Canadian Patent Application No. 2,869,001 dated Aug. 31, 2016.
Office Action for Canadian Patent Application No. 2,869,001 dated Feb. 1, 2016.
Partial European Search Report for European Patent Application No. 14156972.3 dated Jun. 6, 2014.

* cited by examiner

INTEGRATED COMMUNICATION AND APPLICATION SYSTEM FOR AIRCRAFT

CROSS-REFERENCE TO RELATED APPLICATIONS

This application is a continuation of U.S. patent application Ser. No. 15/584,730, filed on May 2, 2017, which is a continuation of U.S. patent application Ser. No. 14/977,803, now U.S. Pat. No. 9,650,153, filed on Dec. 22, 2015, which is a continuation of U.S. patent application Ser. No. 14/067,629, now U.S. Pat. No. 9,260,182, filed on Oct. 30, 2013. All of these applications are hereby incorporated herein by reference in their entirety.

TECHNICAL FIELD

The present invention relates generally to data communication systems and, in particular, to data communication systems used on aircraft.

BACKGROUND

Aircraft employ a variety of techniques for communicating data with ground-based stations. Aircraft Communications Addressing and Reporting System (ACARS) is a digital datalink system for transmitting short, simple messages between aircraft and ground stations via VHF or satellite links. Some ACARS traffic occurs when the aircraft is at the gate. Various communication technologies, including ACARS, Wi-Fi and cellular connectivity may be used to transfer data from the aircraft to the ground-based station when the aircraft is parked at the gate. Wireless communication obviates the need for airport or airline personnel to physically carry a memory device like a USB key from the aircraft. U.S. Pat. Nos. 7,512,714 and 7,835,734 disclose a technique for using a wireless router to communicate ACARS data.

An electronic flight bag (EFB) is an electronic information management device that helps flight crews perform flight-management tasks in a paperless manner. It is a general-purpose computing platform intended to reduce, or replace, paper-based reference material often found in the pilot's carry-on flight bag, including the aircraft operating manual, flight-crew operating manual, and navigational charts (including moving map for air and ground operations). In addition, the EFB can host purpose-built software applications to automate other functions normally conducted by hand, such as performance take-off calculations.

According to the FAA *Advisory Circular* AC 120-76B, an Electronic Flight Bag is an electronic display system intended primarily for use in the cockpit/flightdeck or cabin. There are three EFB hardware classes: Class 1 devices are standard commercial-off-the-shelf (COTS) equipment such as laptops or handheld electronic devices. These devices are used as loose equipment and are typically stowed during critical phases of flight (below 10,000 feet). A Class 1 EFB is considered a Portable Electronic Device (PED). Class 1 EFBs may be used to display Type B applications in critical phases of flight provided that they are "secured and viewable". Class 2 devices are also Portable Electronic Devices, and range from modified COTS equipment to purpose-built devices. Mounting, power (ship's power as primary) or data connectivity of an EFB typically requires the application of an STC, Type Certificate or Amended Type Certificate. (ref: FAA Order 8900.1). Class 3 devices are considered "installed equipment" and are subject to airworthiness requirements and, unlike PEDs, they must be under design control. The hardware is subject to a limited number of RTCA DO-160E requirements (for non-essential equipment—typical crash safety and Conducted and Radiated Emissions testing). There may be DO-178B requirements for software, but this depends on the application-type defined in the Advisory Circular. Class 3 EFBs are typically installed under STC or other airworthiness approval.

The EFB may host a variety of software applications, which fall into three software categories as set out in AC 120-76: Type A: Static applications, such as document viewer (PDF, HTML, XML formats); Flight Crew Operating Manuals, and other printed documents like airport NOTAM; Type B: Electronic approach charts or approach charts that require panning, zooming, scrolling; Type C: Can be used as a Multi-function display (MFD); in at least one case as part of an Automatic Dependent Surveillance-Broadcast system. Type C applications are subject to airworthiness requirements, such as software certification. Type C applications must run only on Class 3 EFB.

Various improvements in EFB technologies have been made, including for example, U.S. Pat. No. 8,301,368. U.S. Pat. No. 7,840,770 describes how an EFB may be used to update the Flight Management Computer navigational database.

Although various technologies currently exist to facilitate aircraft operations, there remains a need in the industry to provide simpler and more efficient tools for communicating aircraft data and for managing applications. This need is at least partially satisfied by the invention disclosed herein.

SUMMARY

The present invention provides an integrated communication and application system (ICAS) which is implemented using a plurality of ICAS multipurpose portable electronic devices, such as a wireless-enabled touch-sensitive tablets. The devices may be used for receiving data from an aircraft data integration device (ADID) and for also managing various onboard functions. Two devices may be mounted to power data blocks in the cockpit for the captain (pilot) and first officer (co-pilot) to function as electronic flight bags (EFB) while also providing other functions and applications. A third such device (e.g. tablet) is used in the cabin by the flight attendants for other functions such as point-of-sale or virtual load sheet applications. The devices are interchangeable so that the third device may be charged when switched with one of the cockpit devices. When mounted to the power data blocks in the cockpit, the devices may be connected via the ADID to a flight data recorder data bus, e.g. ARINC 717 data bus or equivalent and/or to an avionics data bus, e.g. ARINC 429 data bus or equivalent, in a read-only mode to receive data from these data buses. The tablets may be used to wireless communicate data from the data buses to a ground-based station.

Accordingly, one aspect of the present technology is a data-management system for an aircraft, the system comprising a first tablet docked in a first cockpit holder, the first tablet being connected to power for charging the first tablet and for receiving data from a data hub, a second tablet docked in a second cockpit holder, the second tablet being connected to power for charging the second tablet and for receiving data from the data hub, and a third tablet undocked and interchangeable with the first tablet and the second tablet.

Another aspect of the present technology is a portable electronic device for an integrated communication and application system for an aircraft, the device comprising a memory and processor configured to store and execute an electronic flight bag (EFB) application that provides EFB functions on the portable electronic device and a connector for connecting to a power data block of a cockpit-mounted docking station. The device is configured to receive and display data from an aircraft data integration device.

Another aspect of the present technology is a computer-readable medium comprising instructions in code which when loaded into a memory and executed by a processor of a portable electronic device cause the portable electronic device to execute a runway braking condition application, receive one or more accelerometer readings from an avionics data bus indicative of a deceleration on a runway after a weight on wheels sensor senses contact with the ground on landing, receive an aircraft weight from the avionics data bus, compute a runway braking condition index based on the one or more accelerometer readings and the weight, and cause the device to communicate the runway braking condition index to a ground-based station.

Another aspect of the present technology is a computer-readable medium comprising instructions in code which when loaded into a memory and executed by a processor of a portable electronic device cause the portable electronic device to execute a turbulence indexing application, receive one or more accelerometer readings from an avionics data bus, receive an aircraft weight from the avionics data bus, compute a turbulence index based on the one or more accelerometer readings and the weight, and cause the device to communicate the turbulence index to a ground-based station.

Another aspect of the present technology is a computer-readable medium comprising instructions in code which when loaded into a memory and executed by a processor of a portable electronic device cause the portable electronic device to execute a passenger distribution and cargo application, receive user input via a user interface of the portable electronic device indicating a passenger distribution in the aircraft, and cause the portable electronic device to transmit passenger distribution data to a remote server.

Yet another aspect of the present technology is a method of transferring aircraft data from an aircraft to a portable electronic device, the method comprising receiving at the portable electronic device the aircraft data from a data connection with an aircraft data source without writing data back to the aircraft or from a user interface while being capable of receiving aircraft data via the data connection, and executing an application on the portable electronic device using the aircraft data to present new information about the aircraft or its operating environment that is not available for display on a cockpit display but which is displayable on the portable electronic device based on the aircraft data received by the portable electronic device.

The details and particulars of these aspects of the invention will now be described below, by way of example, with reference to the drawings.

BRIEF DESCRIPTION OF THE DRAWINGS

Further features and advantages of the present technology will become apparent from the following detailed description, taken in combination with the appended drawings, in which.

It will be noted that throughout the appended drawings, like features are identified by like reference numerals.

DETAILED DESCRIPTION OF EMBODIMENTS

The present invention provides an integrated communication and application system. This system is implemented using three portable electronic devices, which may be in the form of touch-screen tablets, two of which are mounted to a power data block in the cockpit for use by the captain (pilot) and first officer (co-pilot). A third device is not mounted to a power data block and is used by the flight attendant(s) in the cabin of the aircraft for other functions or applications such as a point-of-sale application or a virtual load sheet application. The devices are interchangeable, and generally have the same hardware and software load, so that any of the devices can be used in the cockpit or in the cabin. Because the devices are interchangeable, the device most recently used in the cabin can be switched with a fully-charged device in the power data block in the cockpit in order to re-charge the device that was most recently being used in the cabin.

Integrated Communication And Application System (ICAS)

Figure 1:
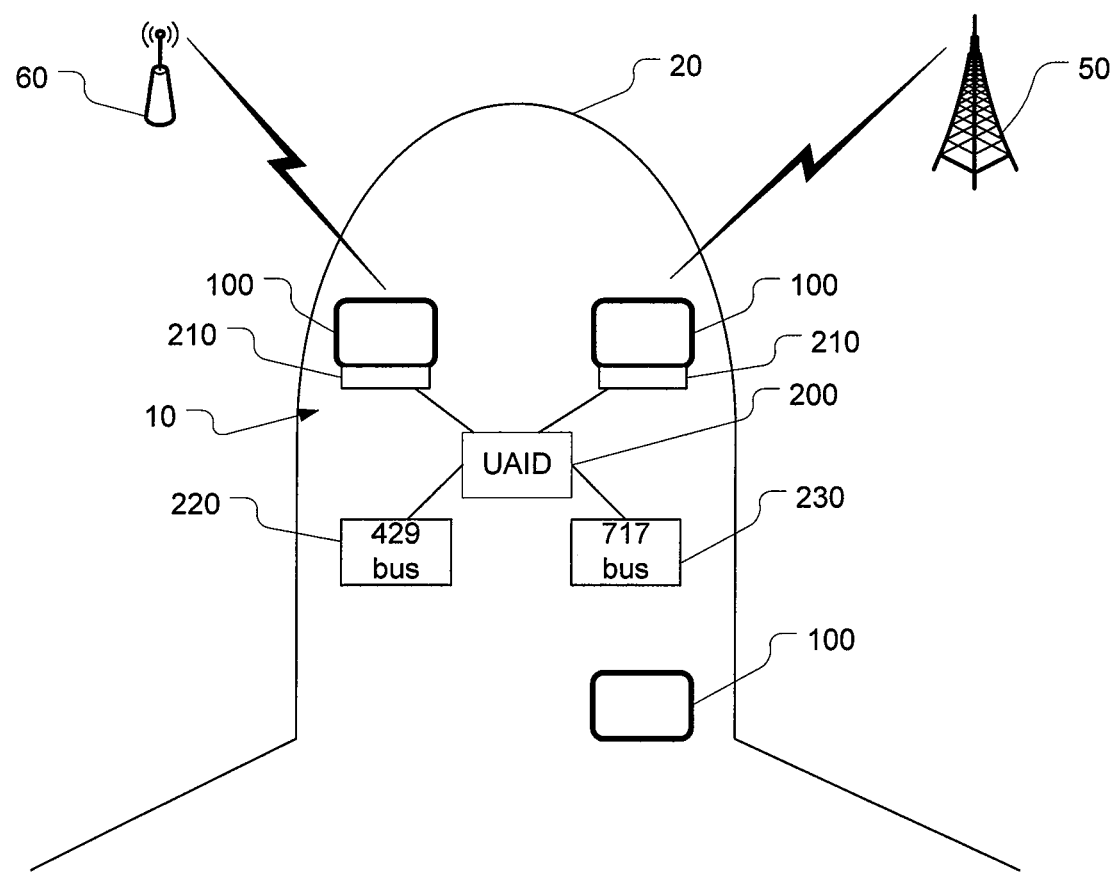
FIG. 1 is a schematic depiction of an integrated communication and application system (ICAS)

FIG. 1 depicts an integrated communication and application system (ICAS) in accordance with an embodiment of the present invention. The ICAS is generally designated by reference numeral 10. The ICAS is shown in an aircraft 20 (which is depicted in the figure as a partial outline of an aircraft). The aircraft may be any commercial passenger aircraft such as, for example, but not limited to, a Boeing 737, 747, 757, 767, 777, 787, Airbus A300, A310, A320, A330, A340, A380, Embraer ERJ-170/175/190/195, Fokker 50/100, Bombardier CRJ series, C Series, Q400, Ilyushin IL-96, Sukhoi Superjet-100, Tupolev Tu-204, etc.

Figure 3:
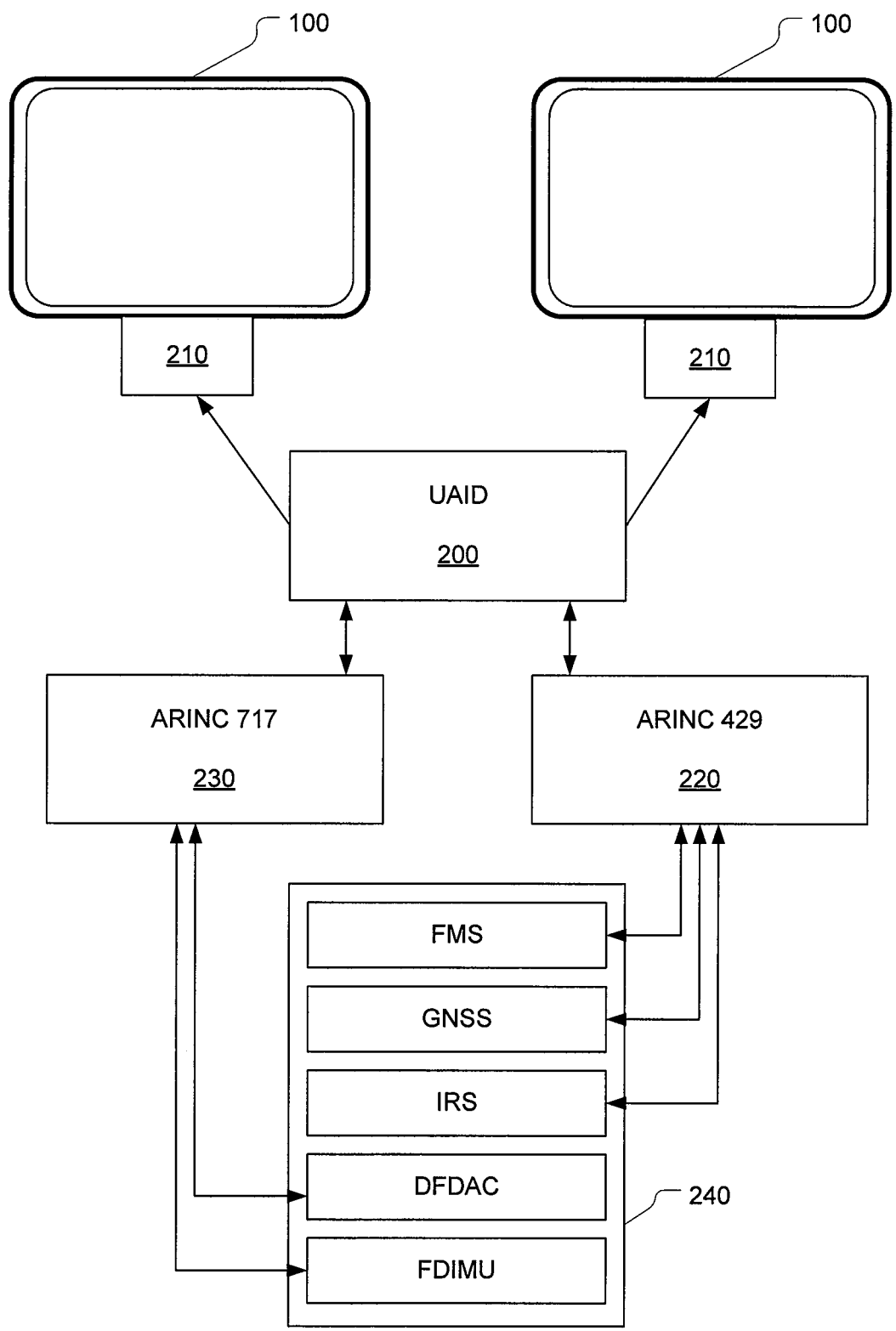
FIG. 3 is a schematic depiction of the ICAS architecture showing how the ICAS tablets interface with the aircraft systems via the ARINC 429 and ARINC 717 data buses.

As shown in FIG. 1, the integrated communication and application system 10 includes a first tablet 100 docked in a first cockpit holder 210. The first tablet 100 is connected to power for charging the first tablet and for receiving data from a data hub such as an aircraft data integration device (ADID) 200. The system includes a second tablet 100 (which may be substantially identical or at least functionally similar to the first tablet) that is also docked in a second cockpit holder 210. The second tablet is also connected to power for charging the second tablet and for receiving data from the data hub or ADID 200. The system includes a third tablet 100 (which may be also substantially identical or at least functionally similar to the first and second tablets). The third tablet, which is located in the passenger cabin aft of the cockpit, is in this embodiment undocked and interchangeable with the first tablet and the second tablet although in other embodiments the third tablet may be docked as well. The first and second tablets 100 may be mounted in respective cockpit holders below the cockpit window in a holder, bracket, frame or mount that includes a power data block for re-charging the device using aircraft electrical power while also providing data connectivity (e.g. Ethernet connectivity) with the aircraft data integration device for reading data from aircraft computer systems. A more specific implementation is depicted by way of example in FIG. 3 which show each tablet connected to the ADID (aircraft integration device) 200 which obtains flight data and aircraft system data via a flight data recorder data bus, e.g. ARINC 717 data bus or equivalent and/or an avionics data bus, e.g. ARINC 429 data bus or equivalent. For the purposes of this specification, it will be appreciated that ARINC 429 and ARINC 717 data buses are used to exemplify a best mode of implementing the invention. Any other suitable data buses may be used instead of ARINC 429 and ARINC 717. As shown by way of example in FIG. 3, ARINC 717 and ARINC 429 receive data from various aircraft systems 240. Specifically, as shown in FIG. 3, ARINC 717 receives data from DFDAC (Digital Flight Data Acquisition Card) and FDIMU (Flight Data Interface Management Unit) and possibly other subsystems whereas ARINC 429 receives data from the Flight Management System (FMS), Global Navigation Satellite System (GNSS), and Inertial Reference System (IRS) and possibly other subsystems.

When mounted in their respective holders, the tablets 100 act as Class 2 devices since they are mounted to receive power and read data from the aircraft computer systems but cannot write data back to the aircraft computer systems. When the tablet is used in the cabin, it has no mount or holder and thus receives no power or wired data. When not in use by the flight attendant, this third tablet may be stowed in a pouch or other secure location when operating under 10,000 feet (3100 meters). As such, the third tablet (the tablet situated in the cabin) acts as a Class 1 or Class 2 device.

In one embodiment, the touch input provided by the pilot on the screen of the first device is automatically shared with and updated on the second device for the co-pilot to see (and vice versa). This means that, in this embodiment, the first and second devices reflect in real-time the inputs provided by the captain (pilot) and first officer (co-pilot). Data may be communicated between the first and second tablets via the ADID which acts as a data switch, router or hub.

In most embodiments, the data hub is an aircraft data integration device 200. This aircraft data integration device 200 is, in most embodiments, connected to an ARINC 429 data bus 220 and to an ARINC 717 data bus 230. The aircraft data integration device 200 may optionally also be connected to other data buses. Alternatively, data from the ADID may be transmitted wirelessly by the tablet 100 via cellular link to a nearby base station tower 50 or via a Wi-Fi connection to a Wi-Fi router (hotspot) 60 at a ground-based station.

Each of the interchangeable portable electronic devices is, in a best mode of implementing the invention, a touch-screen tablet having a memory and a processor. Each tablet (portable electronic device) is a multipurpose or multifunction device capable of performing a multitude of different tasks for the flight crew. The tablet may be any tablet computing device such as the one shown by way of example in FIG. 2. The tablet will be described in greater detail below in the section entitled Portable Electronic Device.

For example, in one embodiment, each of the first, second and third tablets stores and executes an electronic flight bag (EFB) application.

In a further embodiment, each of the first, second and third tablets stores and executes a passenger and cargo loading application. The passenger and cargo loading application may optionally include a digital load sheet with a graphical interface for confirming a seating arrangement. The passenger and cargo loading application may display a seating arrangement of the aircraft (digital load sheet) to enable cabin crew to quickly and efficiently confirm that all passengers are sitting in their assigned seats. The passenger and cargo loading application then transmits its data to a remote server for calculating weight and balance for the aircraft.

In a further embodiment, each of the first, second and third tablets comprises a card reader and executes a point of sale (POS) application. The card reader (or card swiper) may be integrally formed within the tablet, or it may be connected as a peripheral device, or it may be part of a device jacket that is placed around the device.

In a further embodiment, each of the first, second and third tablets comprises a barcode or QR-code scanner and executes a scanning application for scanning a ticket, boarding pass or baggage tag. The tablet may use its onboard embedded digital camera to scan QR codes or barcodes.

In another embodiment, each of the first, second and third tablets stores and executes a plane-tracking application (e.g. Plane Finder) that displays live flight-tracking data on a map to show the real-time positions of all reporting commercial aircraft that are presently airborne.

In another embodiment, each of the first, second and third tablets comprises a digital camera and stores and executes a dent-and-damage application for taking, annotating, storing and sending digital photographs. For example, the captain or first officer may use one of the tablets to take a photograph or video of any dent or damage to the fuselage, wings, engines, etc. The captain or first officer can annotate the photographs with arrows, text, circles, highlighting, or dictate an audio memo. All of this data can be saved on the tablet and uploaded through a wireless network for communication over a TCP/IP network to the airline's headquarters or maintenance/repair hub. Recommendations, fixes or clearances may be received and stored by the tablet.

Figure 4:
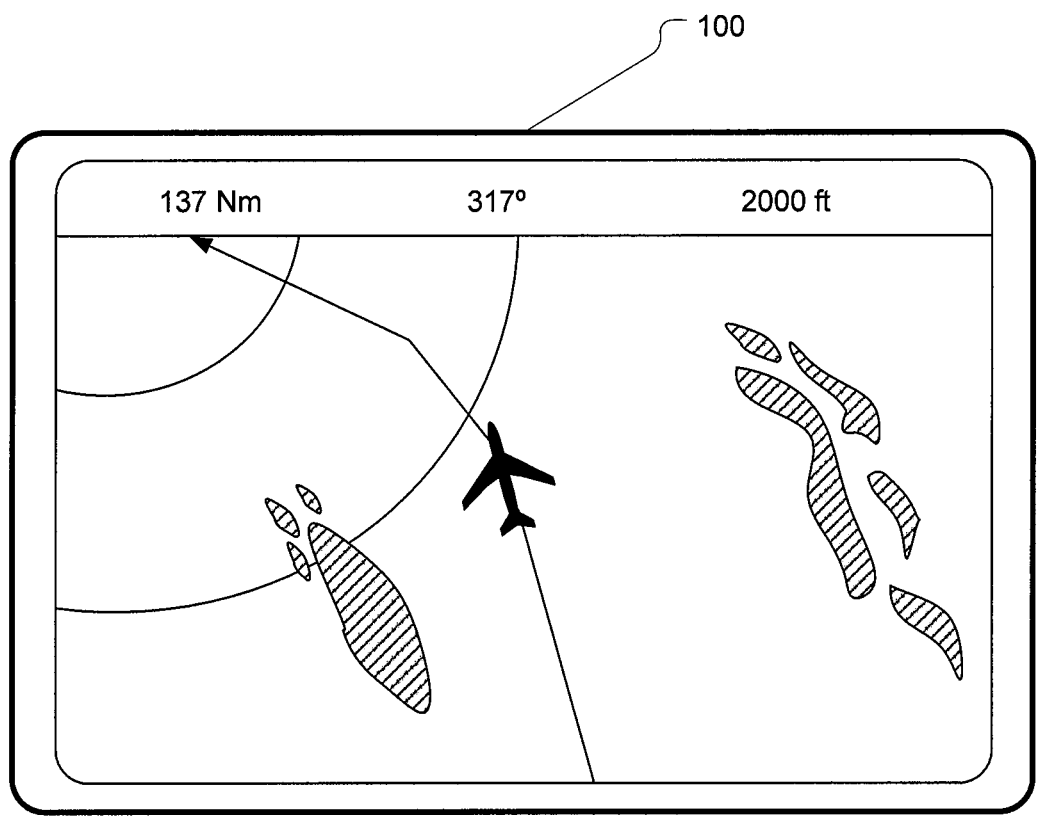
FIG. 4 depicts a tablet displaying graphical weather information as one example of an application that the tablet may execute.

In another embodiment, each of the first, second and third tablets stores and executes a weather application for receiving weather data and for displaying graphical weather imagery. The tablet enables high-definition weather maps including detailed graphical data, photos, videos, etc. may be downloaded wirelessly by one of the three tablets, shared with the other tablets and viewed on the display of any one of the tablets. An example of a tablet or computing tablet displaying graphical weather information is presented in FIG. 4.

Because most tablets are equipped with cameras and microphones and are capable of recording high-definition video, the tablet may also be used by the flight attendant in the cabin to videotape (record) any passenger interference events or incidents (unruly, inebriated or threatening passengers).

The tablet may also be used for cost-indexing applications that optimize flight costs based on weather and fuel costs. The tablet may receive real-time weather or environmental conditions to provide a much more accurate cost analysis for the airline.

The tablets may thus be loaded with all of these aforementioned applications or any combination or sub-combination of these applications. Other applications that are not mentioned above may also be provided. As will be appreciated, the multipurpose tablets may be used for a variety of functions, thereby simplifying flight operations. Since these tablets are read-only devices and cannot write data back to the aircraft computer systems, these tablets or portable electronic devices need not be regulated to the same extent as onboard flight management or avionics computers. The tablet paradigm disclosed herein thus provides a novel platform for receiving, processing and using data that is available from the aircraft. The tablet provides a framework for a multitude of applications that can use aircraft data to provide useful information and functions for the flight crew.

Another aspect of the invention is a method of transferring aircraft data from an aircraft to a portable electronic device. This method entails receiving at the portable electronic device the aircraft data from a data connection with an aircraft data source without writing data back to the aircraft. As such, the device functions as a Class 2 device. Alternatively or additionally, the aircraft data may be received via a user interface of the device (in the form of user input from a pilot or co-pilot) while the Class 2 device is capable of receiving aircraft data via the data connection. In other words, the aircraft data may be transferred directly from the aircraft data source through the data connection to the portable electronic device or, alternatively, data may be entered by the pilot (or co-pilot) or, alternatively, data may be obtained through a combination of both manually inputted data and directly/automatically transferred data. In one exemplary embodiment, the Class 2 device is mounted in a cockpit holder having a data port and a power source connector or cradle. The method further entails executing an application on the portable electronic device using the aircraft data to present new information about the aircraft or its operating environment that is not available for display on a cockpit display but which is displayable on the portable electronic device based on the aircraft data received by the portable electronic device. In other words, the new information is generated and presented by the application on a read-only Class 2 device that reads aircraft data (received directly from the aircraft data buses, aircraft subsystems, aircraft equipment and sensors and/or received via the user interface) to provide new information that would otherwise not be displayable on the cockpit display. New Information, for the purposes of this specification, means any information (be it numerical, symbolic, graphical, or textual, or any combination thereof, whether visually displayed or audibly presented) that the aircraft is not capable of displaying or presenting via its integrated instruments, gauges, screens or displays installed in the cockpit of the aircraft. As such, new information is information about the aircraft, its operating environment or the relationship between the aircraft and its operating environment that is useful to the pilot and co-pilot and which would not be available from the integrated instruments, gauges, screens or displays installed in the cockpit. The new information may be based on computations, calculations, comparisons, interpretations, etc. of the raw or processed aircraft data and may include applying equations, formulas, algorithms, logic, artificial intelligence, etc. to the raw or processed aircraft data to make or draw conclusions, inferences, deductions, conclusions, characterizations, etc. about the aircraft, its operating environment or the relationship between the aircraft and its operating environment for the purposes of providing previously unavailable information to the pilot and co-pilot. For the purposes of this specification, it is understood that the Class 2 portable electronic devices, though mounted in the cockpit, are not part of the "cockpit display". Because the portable electronic device is a Class 2 device functioning in a read-only mode that does not or cannot write any data back to the aircraft, the portable electronic device and any applications executing on the device do not require special certification i.e. do not require the burdensome certification required of a Class 3 device. This enables software developers to develop applications for the PED without having to overcome the administrative hurdles of certification. The present invention therefore provides a novel framework or platform to facilitate the integration and proliferation of useful flight-related applications that can be imported to the PED for use by pilots.

Optionally, the method may involve receiving additional operating environment data at the portable electronic device from a satellite or ground-based transmitter and using the additional data in the application. This additional operating environmental data may include local weather data or runway data, e.g. runway surface conditions. In most embodiments, the additional operating environment data is manually input to the portable electronic device but in some cases could come via the data connection after having been received by the aircraft.

Optionally, the data connection may include an avionics data bus, e.g. an ARINC 429 bus or equivalent. Alternatively or additionally, the data connection may include a flight data recorder data bus, e.g. an ARINC 717 bus or equivalent. In other embodiments, the data connection may include any other suitable data bus.

Optionally, the data source comprises one or more of Flight Management System (FMS), Global Navigation Satellite System (GNSS), Inertial Reference System (IRS), Digital Flight Data Acquisition Card (DFDAC) and Flight Data Interface Management Unit (FDIMU). The aircraft data may be obtained from other data sources.

Figure 5:
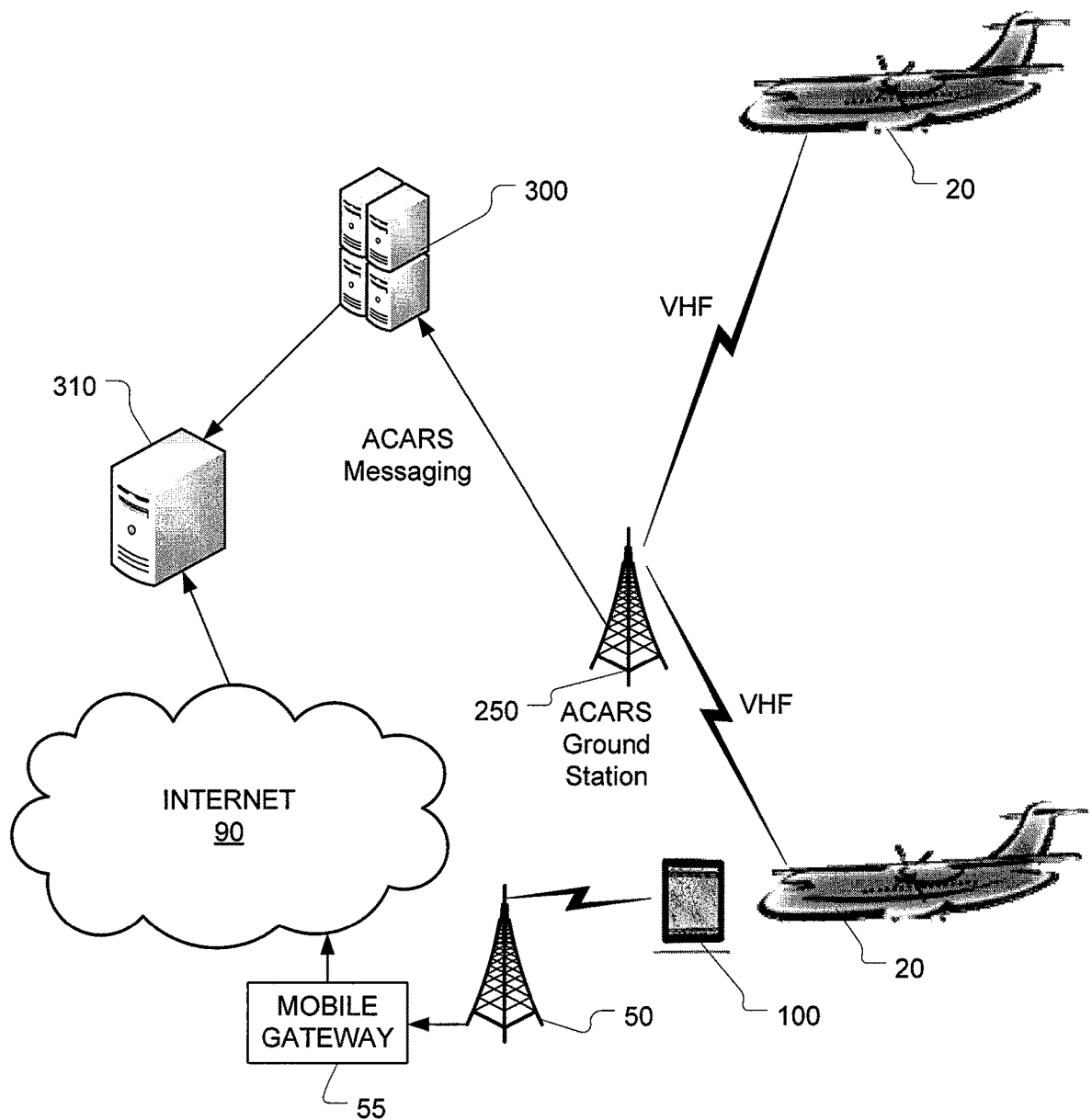
FIG. 5 is a schematic depiction of a dual-mode ICAS-ACARS communication system for an aircraft.

Another feature of the ICAS is that it can provide a dual-mode communication system (i.e. an ICAS-ACARS communication system) as illustrated by way of example in FIG. 5. As depicted in this figure, the aircraft 20 can communicate ACARS data via VHF to an ACARS ground station 250 which then relays the ACARS messaging to a first flight operations server 300. The server 300 may then communicate the data to a second flight operations server 310 as shown in FIG. 5.

The ACARS transmission over VHF may be done when the aircraft 20 is on the ground or in the air. The aircraft 20 shown in FIG. 5 is a commuter turboprop such as the Bombardier Q400 which does not have a satcom system for transmitting ACARS via satellite. The ICAS tablet 100 may be used to transmit ACARS data or any reformatted ACARS data via the cellular base station 50 (or Wi-Fi hotspot) through a mobile gateway 55 to the Internet 90. The data is then forwarded through the Internet as packetized data using standard TCP/IP techniques to the second flight operations server 310 without having to pass through the first flight operations server 300.

Portable Electronic Device

As described above, the integrated communication and application system (ICAS) utilizes three portable electronic devices which, in the best mode, are three touch-sensitive tablet or tablet computing devices. Other touch-sensitive mobile devices may be used for the ICAS although tablets are preferred for their larger screen size. The portable electronic device may be any suitable commercial off-the-shelf (COTS) device, as opposed to a purpose-built device. The portable electronic device is thus any suitable COTS handheld electronic device, personal electronic device, or mobile computing device, such as a touch-screen tablet.

Figure 2:
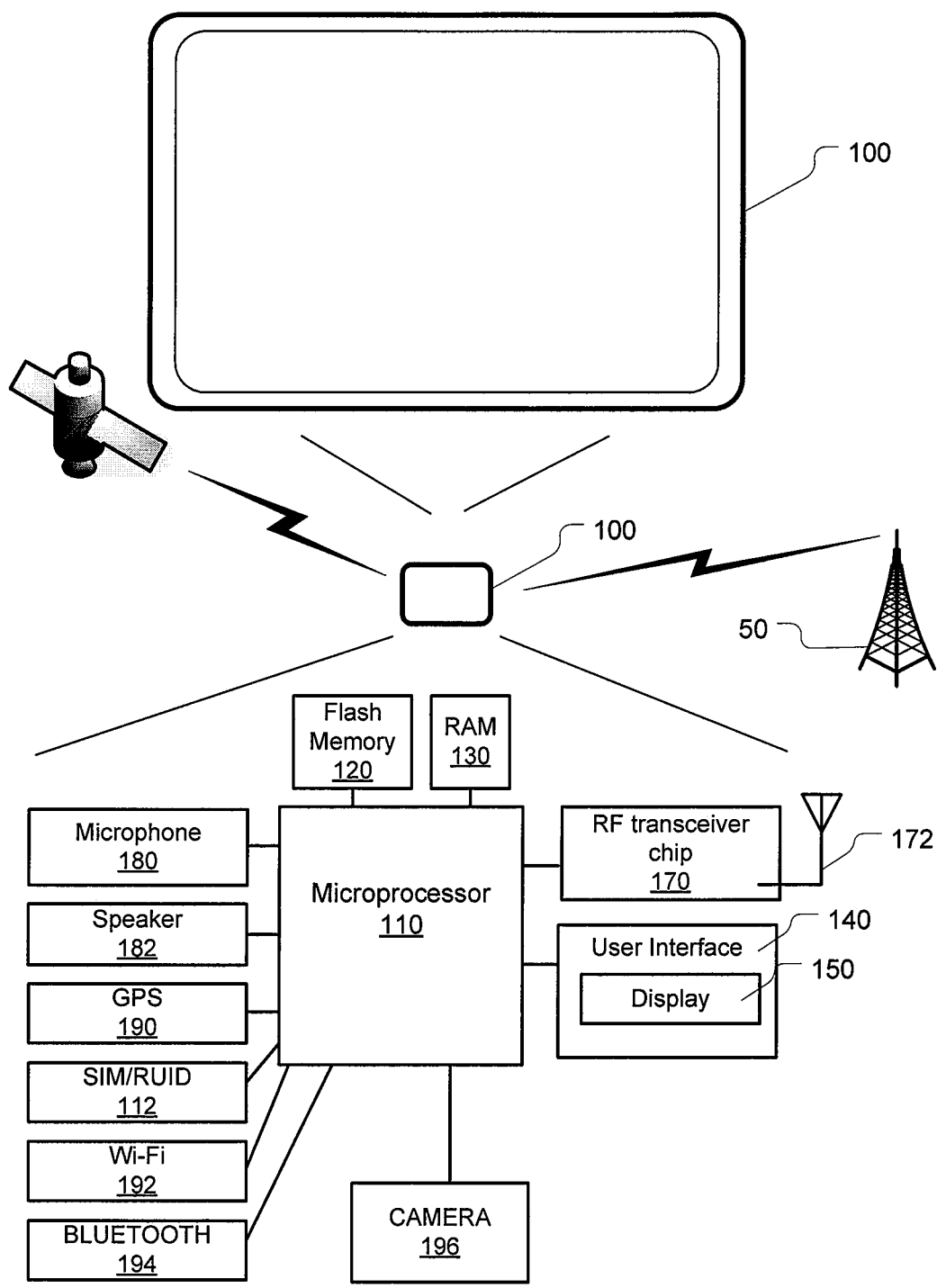
FIG. 2 is a schematic depiction of a tablet for use in the ICAS, with a block-diagram depiction of main components of the tablet.

An exemplary ICAS tablet 100 is shown by way of example in FIG. 2. As shown in this figure, the ICAS tablet 100 includes a processor 110 and memory 120, 130 for executing one or more applications such as an electronic flight bag (EFB) application or any of the other non-EFB applications described in this specification. The tablet 100 may be a commercial-off-the-shelf (COTS) tablet having an operating system and various applications such as a web browser, an e-mail application, a photo viewer, a video viewer, etc. The memory may include flash memory 120 and/or random access memory (RAM) 130. Other types or forms of memory may be used.

As depicted by way of example in FIG. 2, the tablet 100 includes a user interface 140 for interacting with the tablet and its applications. The user interface 140 may include one or more input/output devices, such as a touch-sensitive display screen 150. Any suitable touch-sensitive display technology (e.g. capacitive, resistive or surface acoustic wave, etc.) may be used. The tablet 100 may include a microphone 180, a speaker 182 and/or an earphone jack for an ear bud, for earphones or for an audio headset.

As depicted by way of example in FIG. 2, the tablet 100 may include a wireless transceiver 170 connected to an embedded antenna 172 for communicating with other devices. The transceiver 170 may be a cellular radiofrequency (RF) transceiver for wirelessly communicating with one or more base stations 50 over a cellular wireless network using 3G/4G cellular communication protocols and standards for packet data transfer such as GSM, CDMA, GPRS, EDGE, UMTS, LTE, HSPA, etc. The tablet may include a Subscriber Identity Module (SIM) card 112 for GSM-type devices or a Re-Usable Identification Module (RUIM) card for CDMA-type devices. The RF transceiver 170 may include separate voice and data channels. The tablet 100 may have a Wi-Fi™ transceiver 192 instead of the cellular RF transceiver 170 or in addition to the cellular RF transceiver 170. The tablet may optionally include a Bluetooth® transceiver 194 and/or a near-field communications (NFC) chip. The tablet 100 may also optionally include a transceiver for WiMax™ (IEEE 802.16), a transceiver for Zig-Bee® (IEEE 802.15.4-2003 or other wireless portable area networks), an infrared transceiver or an ultra-wideband transceiver.

The tablet 100 may optionally include one or more ports or sockets for wired connections, e.g. USB, HDMI, FireWire (IEEE 1394), etc. or for receiving non-volatile memory cards, e.g. SD (Secure Digital) card, miniSD card or microSD card.

Optionally, the tablet 100 may include a position-determining subsystem such as a Global Navigation Satellite System (GNSS) receiver which may be, for example, a Global Positioning System (GPS) receiver 190.

The tablet may also include a digital camera 196 for taking digital photos or videos.

This portable electronic device, which may be in the form of a wireless-enabled touch-screen tablet or other equivalent mobile device, may include both EFB and non-EFB applications. The EFB application provides electronic flight bag functions e.g. charts, approach plates (e.g. TEFIS), weather overlay, moving map, journey log, electronic flight folder, integration with third party chart providers, and may also provide functions like business intelligence and passenger relationship management. The tablet or PED 100 also includes other non-EFB applications that perform non-EFB functions. Examples of non-EFB functions are passenger and cargo loading, point-of-sale, dent and damage, etc. The tablet or PED thus acts as a multipurpose or multifunction device that consolidates a number of flight crew functions into a single device. Any EFB or non-EFB application may be performed by any one of the three tablets in the ICAS system.

The pilot, co-pilot or other member of the flight crew may log into the tablet or PED 100 using portable login credentials (e.g. username, password, biometrics, cryptographic token, etc.). Once the user has logged in, the tablet 100 may be used for EFB functions or for any of the non-EFB functions such as executing a passenger and cargo loading application and/or executing a point-of-sale (POS) application and executing a dent and damage application. Any number of other applications may be added to the tablet for passenger/customer relations, crew pay management, flight crew scheduling, or other tasks or functions.

The tablet 100 may also be used for communications between the flight deck and the cabin crew, e.g. via a Wi-Fi™ or other short-range wireless connection.

It will be appreciated that the tablet 100 may be used on the aircraft or off the aircraft, e.g. on the ramp or jet way or even on the tarmac or in the airport terminal. It will be furthermore appreciated that the tablet 100 may be used when the aircraft is flying (airborne) or when the aircraft is taxiing on the ground or parked at the gate. When the aircraft is at the gate, cellular communications may be used. When cellular connectivity is enabled, the tablet 100 may be used for voice communications as well as packetized data transmission over the cellular link. Even though a cellular link is available, the tablet 100 may continue to use Wi-Fi to minimize data charges. In one embodiment, the Wi-Fi may be enabled when the tablet detects that it is roaming and only uses the cellular link when back at its home airport. The tablet 100 may thus be configured to transmit or receive various types of data relating to various applications, functions, tasks, or modules including passenger and cargo loading, eJourney Log, Electronic Flight Folder, eTechlog, Large Document Manager, Integration with 3rd Party Chart Provider, Forms Designer, Business Intelligence, and Passenger Relationship Management.

In the embodiments disclosed above, the system uses three ICAS tablets that function as interchangeable PEDs. However, it will be appreciated that the system may be expanded to include a fourth PED (for example for a second flight attendant). The system may even be expanded beyond four PEDs for very large aircraft with a larger cabin crew.

What follow are some novel applications that may be executed on the PED.

Runway Braking Condition Indexing Application

Another inventive aspect is an application for determining a runway braking condition. This software application is embodied as a computer-readable medium comprising instructions in code which when loaded into a memory and executed by a processor of a portable electronic device cause the portable electronic device to execute a runway braking condition application. The application receives one or more accelerometer readings from an avionics data bus, e.g. ARINC 429/717, indicative of a deceleration on a runway after a weight on wheels sensor senses contact with the ground on landing. The application also receives an aircraft weight from the avionics data bus. Using the deceleration and weight data, the application computes a runway braking condition index (or score or other value). The deceleration data may be based on the one or more accelerometer readings. Once the braking condition index is determined, the device may display and/or cause the device to communicate the runway braking condition index to a ground-based station. The application may be automatically invoked when the aircraft ground speed reaches zero or in response to user input (a pilot or co-pilot command).

Turbulence Indexing Application

Yet another inventive aspect is an application for determining a turbulence index. This software application is embodied as a computer-readable medium comprising instructions in code which when loaded into a memory and executed by a processor of a portable electronic device cause the portable electronic device to execute a turbulence indexing application. The application receives one or more accelerometer readings from an avionics data bus, e.g. ARINC 429/717, and receives an aircraft weight from the avionics data bus. The application then computes a turbulence index (or score or other value) based on the one or more accelerometer readings and the weight. The application then displays and/or causes the device to communicate the turbulence index to a ground-based station. The turbulence indexing application may be invoked automatically in response to a turbulence event (accelerometer reading exceeding a predetermined threshold) or in response to user input (a command from the pilot or co-pilot).

Passenger Distribution and Cargo Application

Yet another inventive aspect is an application for determining a passenger weight and distribution in the aircraft. This software application is embodied as a computer-readable medium comprising instructions in code which when loaded into a memory and executed by a processor of a portable electronic device cause the portable electronic device to execute a passenger weight and distribution application. The application receives input from the user interface of the PED (typically from the flight attendant) indicating the passenger distribution in the cabin. The application is programmed to cause the PED to transmit this data to a remote server that computes the weight and balance result for the aircraft using this and other data. This weight and balance result is then transmitted back to the aircraft.

Any of the methods disclosed herein may be implemented in hardware, software, firmware or any combination thereof. Where implemented as software, the method steps, acts or operations may be programmed or coded as computer-readable instructions and recorded electronically, magnetically or optically on a fixed or non-transitory computer-readable medium, computer-readable memory, machine-readable memory or computer program product. In other words, the computer-readable memory or computer-readable medium comprises instructions in code which when loaded into a memory and executed on a processor of a computing device cause the computing device to perform one or more of the foregoing method(s).

A computer-readable medium can be any means that contain, store, communicate, propagate or transport the program for use by or in connection with the instruction execution system, apparatus or device. The computer-readable medium may be electronic, magnetic, optical, electromagnetic, infrared or any semiconductor system or device. For example, computer executable code to perform the methods disclosed herein may be tangibly recorded on a computer-readable medium including, but not limited to, a floppy-disk, a CD-ROM, a DVD, RAM, ROM, EPROM, Flash Memory or any suitable memory card, etc. The method may also be implemented in hardware. A hardware implementation might employ discrete logic circuits having logic gates for implementing logic functions on data signals, an application-specific integrated circuit (ASIC) having appropriate combinational logic gates, a programmable gate array (PGA), a field programmable gate array (FPGA), etc.

This invention has been described in terms of specific embodiments, implementations and configurations which are intended to be exemplary only. Persons of ordinary skill in the art will appreciate, having read this disclosure, that many obvious variations, modifications and refinements may be made without departing from the inventive concept(s) presented herein. The scope of the exclusive right sought by the Applicant(s) is therefore intended to be limited solely by the appended claims.

The invention claimed is:

1. An aircraft system comprising:
a first portable electronic device docked in a first cockpit holder, the first portable electronic device being connected to power for charging the first portable electronic device and for receiving data from a data hub;
a second portable electronic device docked in a second cockpit holder, the second portable electronic device being connected to power for charging the second portable electronic device and for receiving data from the data hub wherein the first and second portable electronic devices are communicatively connected so that user input received by one of the first and second portable electronic devices for one or more applications is displayed simultaneously on both of the first and second portable electronic devices; and
a third portable electronic device undocked and interchangeable with the first portable electronic device and the second portable electronic device.

2. The system as claimed in claim 1 wherein the data hub is an aircraft data integration device connected to an avionics data bus and to a flight data recorder data bus.

3. The system as claimed in claim 1 wherein the one or more applications includes a passenger and cargo loading application.

4. The system as claimed in claim 3 wherein the passenger and cargo loading application includes a digital load sheet with a graphical interface for confirming a seating arrangement.

5. The system as claimed in claim 1 wherein each of the first, second and third portable electronic devices comprises a card reader and executes a point of sale (POS) application.

6. The system as claimed in claim 1 wherein each of the first, second and third portable electronic devices comprises an embedded digital camera to scan a barcode or QR-code of a ticket, boarding pass or baggage tag.

7. The system as claimed in claim 1 wherein the one or more applications includes a turbulence indexing application that receives one or more accelerometer readings from an avionics data bus and an aircraft weight from the avionics data bus and then executes a turbulence computation to compute a turbulence index based on the one or more accelerometer readings and the weight and for communicating the turbulence index to a ground-based station.

8. The system as claimed in claim 1 wherein the one or more applications includes a runway braking condition application that receives one or more accelerometer readings from an avionics data bus indicative of a deceleration on a runway after a weight on wheels sensor senses contact with the ground on landing and an aircraft weight from the avionics data bus and then executes a runway braking condition computation to compute a runway braking condition index based on the one or more accelerometer readings and the weight and for communicating the runway braking condition index to a ground-based station.

9. The system as claimed in claim 1 wherein the one or more applications includes a dent-and-damage application for taking, annotating, storing and sending digital photographs.

10. The system as claimed in claim 1 wherein the one or more applications includes a weather application for receiving weather data and for displaying color graphical weather imagery.

11. The system as claimed in claim 1 wherein the first, second and third portable electronic devices each comprises a cellular transceiver and a W-Fi transceiver and wherein a processor of each of the first and second portable electronic devices selects the cellular transceiver to transmit ACARS data when located at a home airport and selects the W-Fi transceiver to transmit the ACARS data when roaming.

12. A method of presenting aircraft data from an aircraft on a portable electronic device, the method comprising:
docking a first portable electronic device in a first cockpit holder, the first portable electronic device being connected to power for charging the first portable electronic device and for receiving the aircraft data from a data hub;
docking a second portable electronic device in a second cockpit holder, the second portable electronic device being connected to power for charging the second portable electronic device and for receiving the aircraft data from the data hub wherein the first and second portable electronic devices are communicatively connected so that user input received by one of the first and second portable electronic devices for one or more applications is displayed simultaneously on both of the first and second portable electronic devices; and
providing a third portable electronic device that is undocked and interchangeable with the first portable electronic device and the second portable electronic device.

13. The method as claimed in claim 12 further comprising:
transmitting ACARS data via a cellular transceiver of one of the first, second and third portable electronic devices when located at a home airport; and
transmitting the ACARS data using a W-Fi transceiver of one of the first, second and third portable electronic devices when roaming.

14. The method as claimed in claim 12 wherein the one or more applications comprises a passenger and cargo loading application.

15. The method as claimed in claim 12 wherein the one or more applications comprises a point of sale (POS) application.

16. The method as claimed in claim 12 further comprising using an embedded digital camera in one of the first, second and third portable electronic devices to scan a barcode or QR-code of a ticket, boarding pass or baggage tag.

17. The method as claimed in claim 12 wherein the one or more applications comprises a turbulence indexing application that receives one or more accelerometer readings from an avionics data bus and an aircraft weight from the avionics data bus and then executes a turbulence computation to compute a turbulence index based on the one or more accelerometer readings and the weight and for communicating the turbulence index to a ground-based station.

18. The method as claimed in claim 12 wherein the one or more applications comprises a runway braking condition application that receives one or more accelerometer readings from an avionics data bus indicative of a deceleration on a runway after a weight on wheels sensor senses contact with the ground on landing and an aircraft weight from the avionics data bus and then executes a runway braking condition computation to compute a runway braking condition index based on the one or more accelerometer readings and the weight and for communicating the runway braking condition index to a ground-based station.

19. The method as claimed in claim 12 wherein the one or more applications comprises a dent-and-damage application for taking, annotating, storing and sending digital photographs.

20. The method as claimed in claim 12 wherein the one or more applications comprises a weather application for receiving weather data and for displaying color graphical weather imagery.

* * * * *

UNITED STATES PATENT AND TRADEMARK OFFICE
CERTIFICATE OF CORRECTION

PATENT NO. : 10,707,951 B2
APPLICATION NO. : 15/916559
DATED : July 7, 2020
INVENTOR(S) : David Hathaway It is certified that error appears in the above-identified patent and that said Letters Patent is hereby corrected as shown below:

Claim 11, Column 13, Line 12, "W-Fi" should be changed to --Wi-Fi--.
Claim 11, Column 13, Line 15, "W-Fi" should be changed to --Wi-Fi--.
Claim 13, Column 14, Line 1, "W-Fi" should be changed to --Wi-Fi--.

Signed and Sealed this
Second Day of February, 2021

Drew Hirshfeld
*Performing the Functions and Duties of the*
*Under Secretary of Commerce for Intellectual Property and*
*Director of the United States Patent and Trademark Office*